United States Patent
Park et al.

(10) Patent No.: US 12,288,881 B2
(45) Date of Patent: Apr. 29, 2025

(54) CATHODE ADDITIVE FOR LITHIUM SECONDARY BATTERY, PREPARATION METHOD THEREFOR, CATHODE FOR LITHIUM SECONDARY BATTERY, COMPRISING SAME, AND LITHIUM SECONDARY BATTERY COMPRISING SAME

(71) Applicants: POSCO, Pohang-si (KR); RESEARCH INSTITUTE OF INDUSTRIAL SCIENCE & TECHNOLOGY, Pohang-si (KR)

(72) Inventors: Jong Il Park, Pohang-si (KR); Jae Myung Lee, Pohang-si (KR); Geun Hwangbo, Incheon (KR); Sang Cheol Nam, Seoul (KR)

(73) Assignees: POSCO CO., LTD, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 931 days.

(21) Appl. No.: 17/298,778

(22) PCT Filed: Nov. 12, 2019

(86) PCT No.: PCT/KR2019/015354
§ 371 (c)(1),
(2) Date: Nov. 4, 2021

(87) PCT Pub. No.: WO2020/111580
PCT Pub. Date: Jun. 4, 2020

(65) Prior Publication Data
US 2022/0181627 A1  Jun. 9, 2022

(30) Foreign Application Priority Data
Nov. 30, 2018 (KR) .......... 10-2018-0153090

(51) Int. Cl.
*H01M 4/62* (2006.01)
*C01G 51/42* (2025.01)
(Continued)

(52) U.S. Cl.
CPC .............. *H01M 4/62* (2013.01); *C01G 51/42* (2013.01); *C01G 51/82* (2025.01); *H01M 4/131* (2013.01);
(Continued)

(58) Field of Classification Search
CPC .............................. C01G 51/42; H01M 4/131
See application file for complete search history.

(56) References Cited

U.S. PATENT DOCUMENTS

| 6,103,213 A * | 8/2000 | Nakamura | H01M 10/0525 |
| | | | 423/594.6 |
| 2013/0171524 A1 | 7/2013 | Cho et al. | |

(Continued)

FOREIGN PATENT DOCUMENTS

| CN | 101276911 A | 10/2008 |
| CN | 107180955 A | 9/2017 |

(Continued)

OTHER PUBLICATIONS

Translation of CN-108807860-A (Year: 2018).*

(Continued)

*Primary Examiner* — Maria Laios
*Assistant Examiner* — Zackary Richard Cochenour
(74) *Attorney, Agent, or Firm* — Morgan, Lewis & Bockius LLP

(57) ABSTRACT

The present disclosure relates to a positive electrode additive for a lithium secondary battery, a manufacturing method thereof. The positive electrode additive for a lithium secondary battery is represented by Chemical Formula 1 below.

$$Li_{6x}Co_{1-y}M_yO_4 \qquad \text{[Chemical Formula 1]}$$

(Continued)

(In the Chemical Formula 1, $0.9 \leq x \leq 1.1$, $0 < y \leq 0.1$, $My=B_aW_b$, $0 \leq a \leq 0.1$, $0 \leq b \leq 0.1$, and, a and b are not simultaneously 0.)

Another positive electrode additive for a lithium secondary battery includes a core represented by Chemical Formula 2 below; and a coating layer comprising at least one of boron (B) and tungsten (W).

$Li_{6x}CoO_4$ [Chemical Formula 2]

(In the Chemical Formula 2, $0.9 \leq x \leq 1.1$.)

13 Claims, 3 Drawing Sheets

(51) Int. Cl.
*C01G 51/82* (2025.01)
*H01M 4/131* (2010.01)
*H01M 10/0525* (2010.01)
*H01M 4/525* (2010.01)

(52) U.S. Cl.
CPC ..... *H01M 10/0525* (2013.01); *C01P 2006/40* (2013.01); *H01M 4/525* (2013.01)

(56) References Cited

U.S. PATENT DOCUMENTS

| | | | |
|---|---|---|---|
| 2015/0263348 A1* | 9/2015 | Wakizaka | H01M 10/0525 252/182.1 |
| 2015/0372304 A1 | 12/2015 | Hasegawa et al. | |
| 2016/0013476 A1 | 1/2016 | Oh et al. | |
| 2016/0351905 A1 | 12/2016 | Kawamura et al. | |
| 2018/0019504 A1 | 1/2018 | Kim et al. | |
| 2018/0205084 A1 | 7/2018 | Ham et al. | |
| 2019/0165412 A1* | 5/2019 | Jeon | H01M 4/364 |
| 2019/0312279 A1 | 10/2019 | Otsuka et al. | |

FOREIGN PATENT DOCUMENTS

| | | | | |
|---|---|---|---|---|
| CN | 108717977 A | | 10/2018 | |
| CN | 108807860 A | * | 11/2018 | ........ H01M 10/0525 |
| JP | H05-325971 A | | 12/1993 | |
| JP | H09-147863 A | | 6/1997 | |
| JP | 2013-239434 A | | 11/2013 | |
| JP | WO2014/118834 A1 | | 1/2017 | |
| JP | 2017-059443 A | | 3/2017 | |
| JP | WO2018/043515 A1 | | 6/2019 | |
| KR | 10-1064729 B1 | | 9/2011 | |
| KR | 10-1181848 B1 | | 9/2012 | |
| KR | 10-2013-0079109 A | | 7/2013 | |
| KR | 10-2013-0112567 A | | 10/2013 | |
| KR | 10-2015-0034038 A | | 4/2015 | |
| KR | 10-2015-0050458 A | | 5/2015 | |
| KR | 10-2017-0075654 A | | 7/2017 | |
| KR | 10-2017-0112177 A | | 10/2017 | |
| KR | 10-2017-0142024 A | | 12/2017 | |
| WO | 2017003083 A1 | | 1/2017 | |
| WO | 2017183653 A1 | | 10/2017 | |

OTHER PUBLICATIONS

Written Opinion and International Search Report dated Mar. 2, 2020 issued in International Patent Application No. PCT/KR2019/015354 (with English translation).

Office Action issued Jun. 20, 2023 for corresponding Chinese Patent Application No. 201980079154.5.

Extended European Search Report dated Jan. 20, 2022 issued in European Patent Application No. 19891357.6.

M. Noh, et al., "Role of Li6CoO4 Cathode Additive in Li-Ion Cells Containing Low Coulombic Efficiency Anode Material," Journal of the Electrochemical Society, vol. 159, No. 8, Jan. 1, 2012, p. A1329-A1334, XP055618771.

* cited by examiner

[FIG. 1]
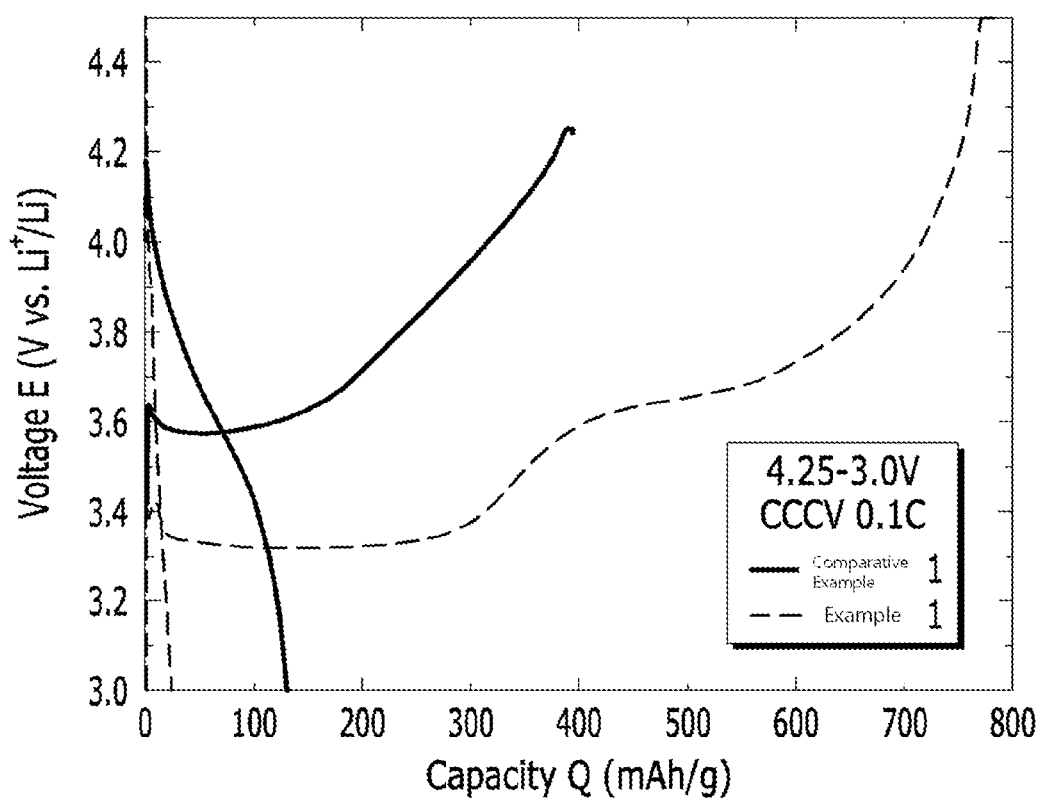

[FIG. 2]
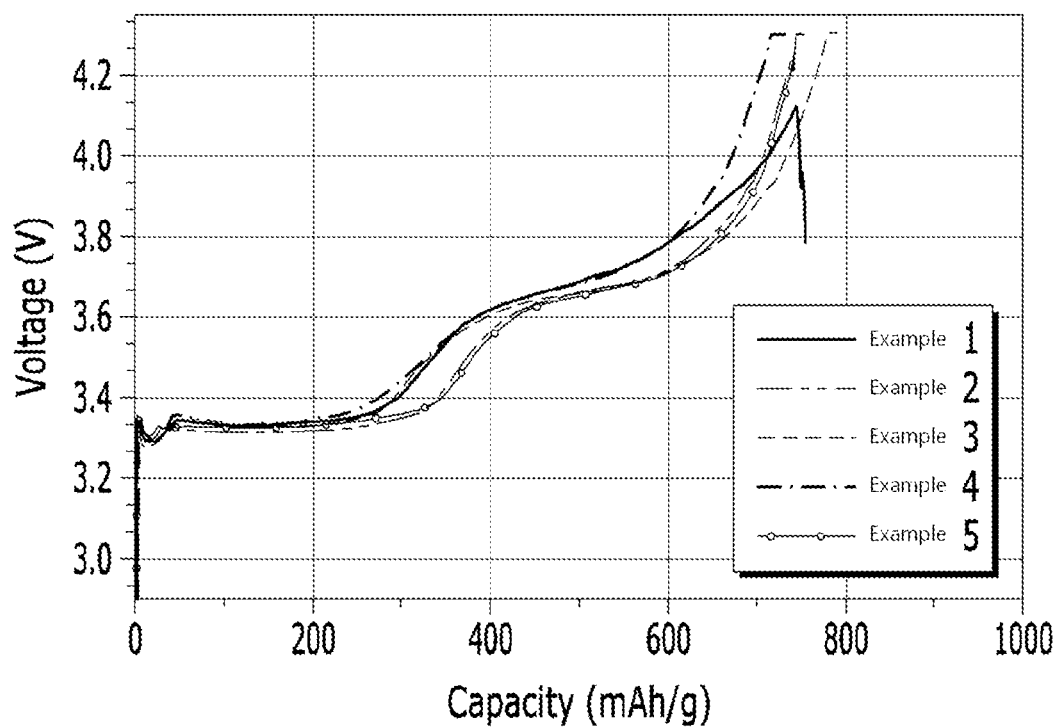

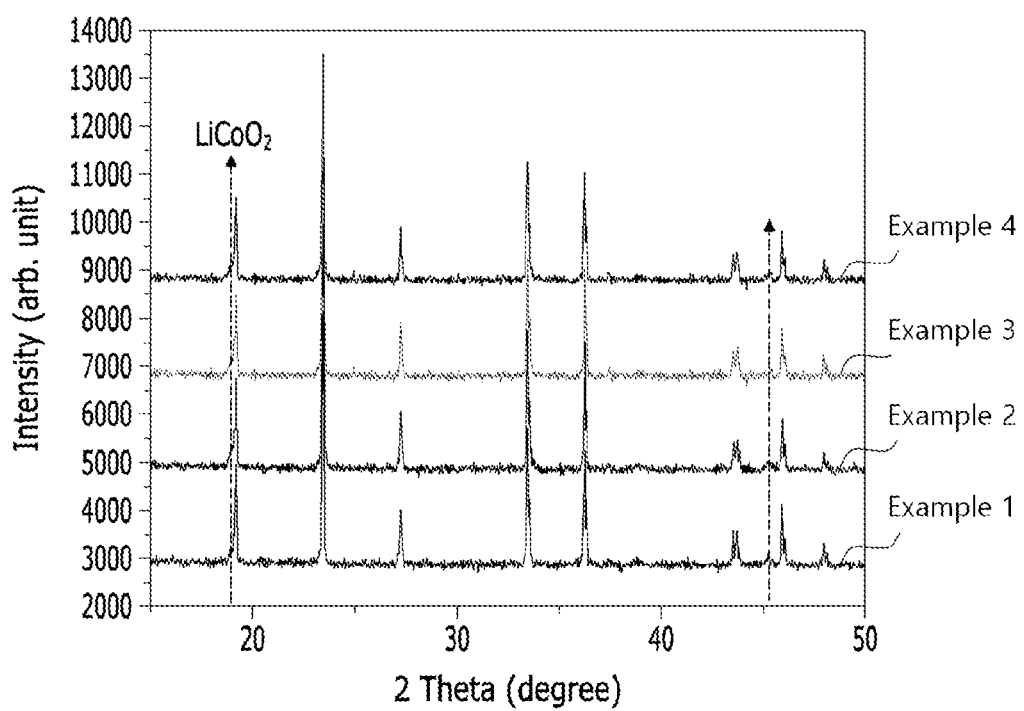
[FIG. 3]

CATHODE ADDITIVE FOR LITHIUM SECONDARY BATTERY, PREPARATION METHOD THEREFOR, CATHODE FOR LITHIUM SECONDARY BATTERY, COMPRISING SAME, AND LITHIUM SECONDARY BATTERY COMPRISING SAME

CROSS-REFERENCE OF RELATED APPLICATIONS

This application is the U.S. National Phase under 35 U.S.C. § 371 of International Patent Application No. PCT/KR2019/015354, filed on Nov. 12, 2019, which in turn claims the benefit of Korean Application Nos. 10-2018-0153090, filed on Nov. 30, 2018, the entire disclosures of which applications are incorporated by reference herein.

BACKGROUND OF THE INVENTION

(a) Field of the Invention

The present invention relates to a positive electrode additive for a lithium secondary battery, a manufacturing method thereof, a positive electrode for a lithium secondary battery including the same, and a lithium secondary battery including the same. More specifically, it relates to a positive electrode additive for a lithium secondary battery that is a non-reversible capacity improving additive for improving the non-reversible characteristic of a negative electrode, a manufacturing method thereof, a positive electrode for a lithium secondary battery including the same, and a lithium secondary battery including the same.

(b) Description of the Related Art

The lithium secondary battery is manufactured in the form of a small battery with high performance and is used as an energy storage source for mobile information communication devices including smartphones, laptops, and computers. Recently, a research is being conducted to manufacture a high-output, large-sized battery and use it in an electric vehicle, a hybrid electric vehicle, and the like.

As a positive active material of the lithium secondary battery, lithium-containing cobalt oxide ($LiCoO_2$) is mainly used, and in addition, lithium-containing manganese oxide such as $LiMn_2O_4$ having a spinel crystal structure, and lithium-containing nickel oxide ($LiNiO_2$) are also used.

Carbon material is mainly used as a negative active material, and lithium metal and sulfur compound are also considered. In particular, the theoretical specific capacity of pure silicon (Si) is 4200 mAh/g, which is 372 of graphite carbon. Since a capacity of silicon is superbly larger than that of graphite, lithium secondary batteries using the Si-based active material are attracting a lot of attention, and some are used as electrodes mixed with carbon materials.

However, when the negative electrode has low non-reversible efficiency compared to the positive electrode, the amount of negative active material is excessively input and that makes negatively effects of the energy density of the battery.

In such an electrode, if the efficiencies of the positive and negative electrodes are adjusted to a similar level, waste of inefficient electrodes can be minimized. For example, when a positive electrode having an efficiency of 100% is used compared to a negative electrode having an efficiency of approximately 100%, the battery may exhibit an efficiency of 100%. On the other hand, when a negative electrode having an efficiency of 90% is used for a positive electrode having an efficiency of 100%, the battery can exhibit only an efficiency of 90%. As a result, there is a problem that 10% of the positive electrode is wasted unnecessarily.

In this regard, a lithium composite oxide containing nickel (Ni) of high-capacity, cobalt (Co), and manganese (Mn) is generally used as a positive active material, and a silicon-carbon composite negative active material may be used. In this case, the non-reversible efficiency of the positive electrode during initial charging and discharging including the initial charging is very high as 90% or more, but the initial non-reversible efficiency of the negative electrode is at the level of 80 to 90%.

Also, due to the difference in non-reversible efficiencies between the positive electrode and the negative electrode, the non-reversible action of the electrode having high non-reversible efficiency is induced. In order to improve this non-reversible action, it is necessary to use more positive active material with high non-reversible efficiency.

Therefore, a small amount of negative active material is input for the design of the battery together with the positive electrode of lithium composite oxide containing the high nickel-containing nickel (Ni), cobalt (Co) and manganese (Mn). In order to design a battery with a high energy density using lithium composite oxide containing high nickel (Ni), cobalt (Co) and manganese (Mn), which is the original purpose, the amount of carbon-based negative active material is reduced. It may be difficult to design efficiently.

Therefore, there is an attempt to improve the non-reversible capacity by adding $Li_2NiO_2$ as a technology that can solve this problem. As the amount of additives increases, slurry gelation by residual lithium remaining in $Li_2NiO_2$ may become a problem. In addition, there is a problem that Ni elution and gas generation continues as the charge and discharge cycle proceeds. There is a high need for improvement in this regard.

SUMMARY OF THE INVENTION

The present invention relates to a positive electrode additive for a lithium secondary battery, a manufacturing method thereof, a positive electrode for a lithium secondary battery including the same, and a lithium secondary battery including the same. More specifically, it relates to a positive electrode additive for a lithium secondary battery that is a non-reversible capacity improving additive for improving the non-reversible characteristic of a negative electrode, a manufacturing method thereof, a positive electrode for a lithium secondary battery including the same, and a lithium secondary battery including the same.

A positive electrode additive for a lithium secondary battery according to an exemplary embodiment of the present invention is represented by Chemical Formula 1 below.

$$Li_{6x}Co_{1-y}M_yO_4 \quad \text{[Chemical Formula 1]}$$

In the Chemical Formula 1, $0.9 \leq x \leq 1.1$, $0 < y \leq 0.1$, $M_y = B_a W_b$, $0 \leq a \leq 0.1$, $0 \leq b \leq 0.1$, and, a and b are not simultaneously 0.

The positive electrode additive may be coated with one or more of boron (B) and tungsten (W).

Another positive electrode additive for a lithium secondary battery according to an exemplary embodiment of the present invention includes a core represented by Chemical Formula 2 below, and a coating layer comprising at least one of boron (B) and tungsten (W).

$$Li_{6x}CoO_4 \quad \text{[Chemical Formula 2]}$$

In the Chemical Formula 2, $0.9 \leq x \leq 1.1$.

On the other hand, the manufacturing method of the positive electrode additive for lithium secondary battery according to an exemplary embodiment of the present invention includes:

preparing a metal hydroxide precursor particle of CoO or Co (OH)$_2$; preparing a mixture by mixing the precursor particle, lithium raw material, and doping raw material; prepare a calcined product by calcining the mixture; and cooling and pulverizing the calcined material. Wherein, the doping raw material comprises at least one of boron (B) and tungsten (W).

The lithium raw material is at least one selected from the group consisting of Li$_2$CO$_3$, LiOH, C$_2$H$_3$LiO$_2$, LiNO$_3$, Li$_2$SO$_4$, Li$_2$SO$_3$, Li$_2$O, Li$_2$O$_2$, and LiCl.

Wherein, a mixing ratio of the precursor particle and the lithium raw material may be 1:5.9 to 1:6.1 by molar ratio.

A mixing ratio of the doping raw material to the mixture may be 0.001 to 0.02 by molar ratio.

In the step of preparing a calcined product by calcining the mixture, the calcination condition is in an inert atmosphere for 1 to 15 hours at a temperature range of 600 to 800° C.

Another manufacturing method of a cathode additive for a lithium secondary battery according to an exemplary embodiment of the present invention includes:

preparing a compound represented by the following Chemical Formula 3; preparing a mixture by mixing the compound and doping raw material; preparing a calcined product by calcining the mixture; and cooling and pulverizing the calcined material. Wherein, the doping raw material comprises at least one of boron (B) and tungsten (W).

$$Li_{6x}Co_aB_bW_cO_4 \qquad \text{[Chemical Formula 3]}$$

In the Chemical Formula 3, $0.9 \leq x \leq 1.1$, $0.9 \leq a \leq 1$, $0 \leq b \leq 0.1$, $0 \leq c \leq 0.1$.

A mixing ratio of the doping raw material to the compound represented by the Chemical Formula 3 may be 0.001 to 0.02 by molar ratio.

In the step of calcining the mixture to prepare a calcined product, a calcining condition may be in an inert atmosphere for 1 to 10 hours in a temperature range of 250 to 450° C.

After obtaining a lithium metal oxide, the method further comprises forming a coating layer by mixing the coating raw material with the lithium metal oxide and calcining that; and the coating raw material comprises at least one of boron (B) and tungsten (W).

On the other hand, the positive electrode for a lithium secondary battery according to an exemplary embodiment of the present invention includes:

a current collector; and a positive active material layer positioned on the current collector surface;

wherein, the positive electrode active material layer comprises a positive electrode active material and a positive electrode additive, the positive electrode additive is represented by the following Chemical Formula 3, and with respect to the sum of 100 wt % of the positive electrode active material and positive electrode additive, the positive electrode additive is 0.1 to 7 wt %.

$$Li_{6x}Co_aB_bW_cO_4 \qquad \text{[Chemical Formula 3]}$$

In the Chemical Formula 3, $0.9 \leq x \leq 1.1$, $0.9 \leq a \leq 1$, $0 \leq b \leq 0.1$, and $0 \leq c \leq 0.1$.

The positive electrode additive is decomposed during initial charging and discharging and converted into a Li supply source and a compound represented by Chemical Formula 4 below.

$$LiCo_{1-y}M_yO_2 \qquad \text{[Chemical Formula 4]}$$

In the Chemical Formula 4, $0 < y \leq 0.1$, $M_y = B_aW_b$, $0 \leq a \leq 0.1$, $0 \leq b \leq 0.1$.

The positive electrode additive is coated with at least one of boron (B) and tungsten (W).

On the other hand, the lithium secondary battery according to an exemplary embodiment of the present invention includes:

a positive electrode; a negative electrode; and an electrolyte positioned between the positive and negative electrodes, wherein, the positive electrode comprises the above-mentioned positive electrode additive.

A positive electrode additive for a secondary battery, which is a non-reversible capacity improvement additive for improving the non-reversible characteristic of the negative electrode according to the present invention, can be used. This makes it possible to exhibit 100% efficiency of the battery. In addition, it is possible to increase the cycle-life of the battery by solving the problem of gelation or gas generation due to the non-reversible capacity improvement additive.

BRIEF DESCRIPTION OF THE DRAWINGS

FIG. 1 shows the initial charge capacity (0.1 C charge) of the positive electrode additive for a lithium secondary battery according to an exemplary embodiment of the present invention.

FIG. 2 shows the initial charge capacity (0.1 C charge) of the positive electrode additive for a lithium secondary battery according to an exemplary embodiment of the present invention.

FIG. 3 shows the XRD analysis result of the positive electrode additive for lithium secondary battery according to an exemplary embodiment of the present invention.

DETAILED DESCRIPTION OF THE EMBODIMENTS

In this specification, terms such as first, second and third are used to describe various parts, components, regions, layers and/or sections, but are not limited thereto. These terms are used only to distinguish one part, component, region, layer or section from another part, component, region, layer or section. Accordingly, the first part, component, region, layer or section described below may be referred to as the second part, component, region, layer or section without departing from the scope of the present invention.

In this specification, unless explicitly described to the contrary, the word "comprise", and variations such as "comprises" or "comprising", will be understood to imply the inclusion of stated elements but not the exclusion of any other elements.

In this specification, the terminology used is for the purpose of referring only to specific exemplary embodiments, and is not intended to limit the present invention. As used herein, the singular forms also include the plural forms unless the phrases clearly indicate the opposite. The meaning of "comprising" as used in the specification specifies a particular characteristic, region, integer, step, operation, element and/or component, and it does not exclude another characteristic, region, integer, step, operation, element and/or presence or addition of component.

In this specification, the term "combination thereof" included in the expression of the Markush format means at least one mixture or combination selected from the group consisting of constituent elements described in the expression of the Markush format. It means to include one or more selected from the group consisting of the above components.

In this specification, when it is mentioned that a part is "on" or "above" the other part, it may be directly on or above the other part, or another part may be accompanied in between. In contrast, when a part refers to being "directly on" another part, there is no intervening part in between.

Although not defined differently, all terms including technical and scientific terms used herein have the same meaning as commonly understood by a person of an ordinary skill in the technical field to which the present invention belongs. Commonly used terms defined in the dictionary are further interpreted as having a meaning consistent with the related technical literature and the presently disclosed content, and unless defined, are not interpreted in an ideal or very formal meaning.

In addition, unless otherwise specified, % means wt %, and 1 ppm is 0.0001 wt %.

Hereinafter, an exemplary embodiment of the present invention will be described in detail so that a person of an ordinary skill in the technical field to which the present invention belongs can easily implement. As those skilled in the art would realize, the described embodiments may be modified in various different ways, all without departing from the spirit or scope of the present invention.

Advantages and features of the present invention, and methods for achieving them will become apparent when referring to the exemplary embodiments described below in detail with the accompanying drawings. However, the present invention is not limited to the exemplary embodiments disclosed below, but may be implemented in various different forms. Only the present exemplary embodiments are provided so that the disclosure of the present invention is complete, and to completely inform a person of an ordinary skill in the technical field to which the present invention belongs, the scope of the invention. The present invention is only defined by the scope of the claim. The same reference numerals refer to the same constituent elements throughout the specification.

Accordingly, in some exemplary embodiments, well-known techniques have not been described in detail in order to avoid obscuring the present invention. Unless otherwise defined, all terms (including technical and scientific terms) used in this specification may be used with a meaning that can be commonly understood by a person of an ordinary skill in the technical field to which the present invention belongs.

A positive electrode additive for a lithium secondary battery according to an exemplary embodiment of the present invention is represented by Chemical Formula 1 below. The additive represented by Chemical Formula 1 below is doped lithium rich cobalt oxide.

$$Li_{6x}Co_{1-y}M_yO_4 \qquad \text{[Chemical Formula 1]}$$

In the Chemical Formula 1, $0.9 \leq x \leq 1.1$, $0 < y \leq 0.1$, $M_y = B_aW_b$, $0 \leq a \leq 0.1$, $0 \leq b \leq 0.1$, and, a and b are not simultaneously 0. That is, at least one doping element among boron (B) and tungsten (W) is necessarily included. If one or more doping elements among boron (B) and tungsten (W) are included in the additive, there is merit in reducing the gelation of the cathode material slurry compared to the other case.

In this case, the positive electrode additive may be coating at least one of boron (B) and tungsten (W). When a coating layer is used, stable non-reversible capacity can be realized. In addition, there is no gelation of the cathode material slurry, which is a problem when manufacturing electrode slurry, so there is no problem even if a lot of this additive is used during slurry manufacturing. The reason is as follows. $Li_2O$ and $Li_2CO_3$ remaining on the additive surface are changed into stable lithium boron compound ($LiB_4O_7$) and lithium tungsten compound ($Li_2WO_4$) by reacting boron compound and tungsten compound. Therefore, it is possible to reduce the PVDF binder gelation by basic lithium during slurry production. It can be used more stably in the process of manufacturing the electrode.

In general, lithium in the form of lithium carbonate ($Li_2CO_3$) and lithium hydroxide (LiOH), which do not mainly participate in the reaction, is unavoidably present on the surface of lithium composite oxide containing Ni and Co, and this is called residual lithium. As such, in a battery in which lithium composite oxide, which has residual lithium on its surface, is applied to the positive electrode as a positive electrode active material, gas is generated by the residual lithium during charging and discharging. Specifically, LiOH in residual lithium can react with $CO_2$ in air or $CO_2$ generated by decomposition of carbonate-based electrolyte solution to form $Li_2CO_3$. In addition, $Li_2CO_3$ may react with HF again to generate $CO_2$ gas. Such gas generation causes problems such as a decrease in the initial capacity of the battery and a decrease in initial charging and discharge efficiency. However, when boron or tungsten is added as described above, the amount of residual lithium can be reduced and the initial charge capacity can be improved.

Another positive electrode additive for a lithium secondary battery according to an exemplary embodiment of the present invention includes a core represented by Chemical Formula 2 below, and a coating layer comprising at least one of boron (B) and tungsten (W).

$$Li_{6x}CoO_4 \qquad \text{[Chemical Formula 2]}$$

In the Chemical Formula 2, $0.9 \leq x \leq 1.1$. That is, a coating layer containing at least one of boron (B) and tungsten (W) is coated on overlithiated lithium cobalt oxide. When a coating layer is used, there are the aforementioned effects such as cycle-life characteristic improvement and high temperature stability improvement.

The positive electrode additives mentioned above were developed by the inventors of the present invention after repeated in-depth research and various experiments. It can be effectively used for non-reversible efficiency design, and the conductive network configuration of the electrode can be improved due to its high conductivity. The present invention has been achieved by developing an additive that reduces gelation caused by excessive residual lithium. The positive electrode additives according to an exemplary embodiment of the present invention are used together with the positive electrode active material to achieve 100% efficiency of the battery. Due to the non-reversible capacity improvement effect of the positive electrode additive, the cycle-life of the battery can be increased by solving the problem of gelation and gas generation.

These positive electrode additives participate in the reaction only during initial charging and do not participate in the reaction during discharge as they are decomposed. With this mechanism, the non-reversible efficiency of the battery can be effectively designed.

In addition, the positive electrode additive may exhibit high conductivity in some cases. Therefore, the conductive network configuration of the electrode can also be improved.

On the other hand, the manufacturing method of the positive electrode additive for lithium secondary battery according to an exemplary embodiment of the present invention includes:

preparing a metal hydroxide precursor particle of CoO or Co (OH)$_2$; preparing a mixture by mixing the precursor particle, lithium raw material, and doping raw material; prepare a calcined product by calcining the mixture; and cooling and pulverizing the calcined material. Wherein, the doping raw material comprises at least one of boron (B) and tungsten (W).

The lithium raw material is at least one selected from the group consisting of Li$_2$CO$_3$, LiOH, C$_2$H$_3$LiO$_2$, LiNO$_3$, Li$_2$SO$_4$, Li$_2$SO$_3$, Li$_2$O, Li$_2$O$_2$, and LiCl.

In this case, when the doping raw material is boron (B), the compound is a boron compound, and may be expressed as H$_3$BO$_3$, B$_2$O$_3$, or the like.

In addition, when the doping raw material is tungsten (W), the compound is a tungsten compound, and can be expressed as WO$_3$, H$_2$WO$_4$, (NH$_4$)$_{10}$(H$_2$W$_{12}$O$_{42}$)·4H$_2$O, (NH$_4$)$_6$H$_2$W$_{12}$O$_{40}$·XH$_2$O, etc.

Wherein, a mixing ratio of the precursor particle and the lithium raw material may be 1:5.9 to 1:6.1 by molar ratio.

A mixing ratio of the doping raw material to the mixture may be 0.001 to 0.02 by molar ratio.

In the step of preparing a calcined product by calcining the mixture, the calcination condition is in an inert atmosphere for 1 to 15 hours at a temperature range of 600 to 800° C. More specifically, it may be calcined for 1 to 10 hours.

Thereafter, the additive can be obtained by pulverizing and classifying the calcined product prepared by calcining the mixture.

Another manufacturing method of a cathode additive for a lithium secondary battery according to an exemplary embodiment of the present invention includes:

preparing a compound represented by the following Chemical Formula 3; preparing a mixture by mixing the compound and doping raw material; preparing a calcined product by calcining the mixture; and cooling and pulverizing the calcined material. Wherein, the doping raw material comprises at least one of boron (B) and tungsten (W). That is, it is a method of manufacturing a doped positive electrode additive by mixing an already prepared undoped positive electrode additive with a doping raw material, which is different from the above manufacturing method.

$$Li_{6x}Co_aB_bW_cO_4 \quad \text{[Chemical Formula 3]}$$

In the Chemical Formula 3, 0.9≤x≤1.1, 0.9≤a≤1, 0≤b≤0.1, 0≤c≤0.1.

A mixing ratio of the doping raw material to the compound represented by the Chemical Formula 3 may be 0.001 to 0.02 by molar ratio.

In the step of calcining the mixture to prepare a calcined product, a calcining condition may be in an inert atmosphere for 1 to 10 hours in a temperature range of 250 to 450° C.

After obtaining a lithium metal oxide, the method further comprises forming a coating layer by mixing the coating raw material with the lithium metal oxide and calcining that; and the coating raw material comprises at least one of boron (B) and tungsten (W). That is, the method may further include forming a coating layer.

The positive electrode additive manufactured according to an exemplary embodiment of the present invention may be usefully used in the positive electrode of a lithium secondary battery.

On the other hand, the positive electrode for a lithium secondary battery according to an exemplary embodiment of the present invention includes:
a current collector; and a positive active material layer positioned on the current collector surface;
wherein, the positive electrode active material layer comprises a positive electrode active material and a positive electrode additive,
the positive electrode additive is represented by the following Chemical Formula 3, and
with respect to the sum of 100 wt % of the positive electrode active material and positive electrode additive, the positive electrode additive is 0.1 to 7 wt %. At this time, more specifically, the positive electrode additive may be 0.1 to 3.5 wt %.

$$Li_{6x}Co_aB_bW_cO_4 \quad \text{[Chemical Formula 3]}$$

In the Chemical Formula 3, 0.9≤x≤1.1, 0.9≤a≤1, 0≤b≤0.1, and 0≤c≤0.1.

The positive electrode additive is coated with at least one of boron (B) and tungsten (W).

The positive electrode additive is decomposed during initial charging and discharging and converted into a Li supply source and a compound represented by Chemical Formula 4 below.

$$LiCo_{1-y}M_yO_2 \quad \text{[Chemical Formula 4]}$$

In the Chemical Formula 4, 0<y≤0.1, $M_y=B_aW_b$, 0≤a≤0.1, and 0≤b≤0.1.

The positive electrode additive manufactured according to an exemplary embodiment of the present invention is used for a positive electrode of a lithium secondary battery, and this positive electrode can be usefully used for a lithium secondary battery. That is, the lithium secondary battery according to an exemplary embodiment of the present invention is a positive electrode; negative electrode; and an electrolyte positioned between the positive and negative electrodes, and the positive electrode contains the anode additive mentioned above.

At this time, a positive electrode active material composition is prepared by mixing a positive electrode additive for a lithium secondary battery, which is a non-reversible capacity improving additive, and a positive electrode active material, conductive material, binder and solvent. After that, it is manufactured by coating and drying directly on an aluminum current collector. Alternatively, the positive active material composition is cast on a separate support. Thereafter, it is possible to manufacture by laminating the film obtained by peeling from the support on an aluminum current collector.

At this time, the conductive material uses carbon black, graphite, and metal powder, and the binder is vinylidene fluoride/hexafluoropropylene copolymer, polyvinylidene fluoride, polyacryllonitrile, polymethylmethacrylate, polytetrafluoroethylene and its mixture are possible. In addition, as a solvent, N-methylpyrrolidone, acetone, tetrahydrofuran, decane, etc. are used. At this time, the content of the positive active material, conductive material, binder and solvent is used at the level normally used in lithium secondary batteries.

On the other hand, the negative active material composition is prepared for the negative electrode by mixing the negative active material, the binder and the solvent like the positive electrode. This can be directly coated on the copper current collector. Alternatively, a negative active material film cast on a separate support and peeled from the support is laminated on a copper current collector. At this time, the negative active material composition may further contain a conductive material if necessary.

At this time, as a negative active material, a material capable of intercalation/deintercalation of lithium is used, for example, lithium metal or lithium alloy, coke, artificial graphite, natural graphite, organic polymer compound combust body, carbon fiber, etc. are used. In addition, the conductive material, binder and solvent are used in the same manner as in the case of the anode described above.

In this case, all separators can be used as long as they are commonly used in lithium secondary batteries. For example, polyethylene, polypropylene, polyvinylidene fluoride, or a multilayer of two or more layers thereof may be used. Of course, a mixed multilayer such as a polyethylene/polypropylene two-layer separator, a polyethylene/polypropylene/polyethylene three-layer separator, and a polypropylene/polyethylene/polypropylene three-layer separator can be used.

On the other hand, non-aqueous electrolytes or well-known solid electrolytes can be used as electrolytes charged in lithium secondary batteries, and lithium salts dissolved in them are used.

At this time, the solvent of the non-aqueous electrolyte is not particularly limited, but cyclic carbonates such as ethylene carbonate, propylene carbonate, butylene carbonate, and vinylene carbonate; chain carbonates such as dimethyl carbonate, methyl ethyl carbonate and diethyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitriles such as acetonitrile; and amides such as dimethylformamide, etc. can be used. These can be used singly or in a plurality of combinations. Particularly, a mixed solvent of a cyclic carbonate and a chain carbonate can be preferably used.

On the other hand, as an electrolyte, a gel polymer electrolyte in which an electrolyte solution is impregnated with a polymer electrolyte such as polyethylene oxide or polyacryllonitrile, or an inorganic solid electrolyte such as LiI or LiN is possible.

In this case, the lithium salt may be one selected from the group consisting of $LiPF_6$, $LiBF_4$, $LiSbF_6$, $LiAsF_6$, $LiClO_4$, $LiCF_3SO_3$, Li $(CF_3SO_2)_2N$, $LiC_4F_9SO_3$, $LiSbF_6$, $LiAlO_4$, $LiAlCl_4$, LiCl, and LiI.

Hereinafter, the present invention will be described in more detail through an exemplary embodiment. However, it is necessary to note that the following exemplary embodiment is only for explaining the present invention in more detail by exemplifying the present invention, and not for limiting the scope of the present invention. This is because the scope of the present invention is determined by the matters described in the claims range and matters reasonably inferred therefrom.

Comparative Example 1

1.00 molar ratio NiO and 2.00 molar ratio $Li_2O$ are weighed according to the molar ratio. After that, they are uniformly mixed and charged into a vacuum furnace (Vacuum furnace). A vacuum was drawn in the vacuum furnace, replaced with nitrogen, and the mixture was calcined while nitrogen was inflowed at 0.1 L/min. The calcining condition was raised to 700° C. for 3 hours and maintained at the elevated temperature for 10 hours. Thereafter, the calcined material was cooled, pulverized and classified into micro powder to obtain a $Li_2NiO_2$ positive electrode additive.

Exemplary Embodiment 1

Weigh out 1.00 molar ratio CoO (high purity chemical, 99%) and 3.00 molar ratio $Li_2O$ (Kangfeng, 99%) according to the molar ratio. After that, they are uniformly mixed and charged into a vacuum furnace (Vacuum furnace). A vacuum was drawn in the vacuum furnace, replaced with nitrogen, and the mixture was calcined while nitrogen was inflowed at 0.1 L/min. The calcining condition was raised to 700° C. for 3 hours and maintained at the elevated temperature for 10 hours. Thereafter, the calcined material was cooled, pulverized and classified into micro powder to obtain a positive electrode additive.

Exemplary Embodiment 2

Weigh out 1.00 molar ratio CoO (high purity chemical, 99%) and 3.00 molar ratio $Li_2O$ (Kangfeng, 99%) according to the molar ratio. After that, they are uniformly mixed and charged into a vacuum furnace (Vacuum furnace). A vacuum was drawn in the vacuum furnace, replaced with nitrogen, and the mixture was calcined while nitrogen was inflowed at 0.1 L/min. In the calcining condition, the firing temperature is set to 650° C., and the subsequent process is the same as that of exemplary embodiment 1.

Exemplary Embodiment 3

Weigh out 1.00 molar ratio CoO (high purity chemical, 99%) and 3.00 molar ratio $Li_2O$ (Kangfeng, 99%) according to the molar ratio. After that, they are uniformly mixed and charged into a vacuum furnace (Vacuum furnace). A vacuum was drawn in the vacuum furnace, replaced with nitrogen, and the mixture was calcined while nitrogen was inflowed at 0.1 L/min. In the calcining condition, the firing temperature is set to 600° C., and the subsequent process is the same as that of exemplary embodiment 1.

Exemplary Embodiment 4

Weigh out 1.00 molar ratio CoO (high purity chemical, 99%) and 3.00 molar ratio $Li_2O$ (Kangfeng, 99%) according to the molar ratio. After that, they are uniformly mixed and charged into a vacuum furnace (Vacuum furnace). A vacuum was drawn in the vacuum furnace, replaced with nitrogen, and the mixture was calcined while nitrogen was inflowed at 0.1 L/min. In the calcining condition, the firing temperature is set to 550° C., and the subsequent process is the same as that of exemplary embodiment 1.

Exemplary Embodiment 5

1.00 molar ratio CoO (high purity chemistry, 99%), 3.00 molar ratio $Li_2O$ (Kangfeng, 99%), 0.001 molar ratio $WO_3$ (high purity chemistry, 99%), 0.001 molar ratio $H_3BO_3$ (Samjeon Chemical, 98%) are weighed according to the molar ratio, and the subsequent process is the same as in exemplary embodiment 1.

Exemplary Embodiment 6

1.00 molar ratio CoO (high purity chemistry, 99%), 3.00 molar ratio $Li_2O$ (Kangfeng, 99%), 0.005 molar ratio $WO_3$ (high purity chemical, 99%), 0.005 molar ratio $H_3BO_3$ (Samjeon Chemical, 98%) are weighed according to the molar ratio, and the subsequent process is the same as in exemplary embodiment 1.

Exemplary Embodiment 7

1.00 molar ratio CoO (high purity chemistry, 99%), 3.00 molar ratio $Li_2O$ (Kangfeng, 99%), 0.01 molar ratio $WO_3$ (high purity chemistry, 99%), 0.01 molar ratio $H_3BO_3$ (Samjeon Chemical, 98%) are weighed according to the molar ratio, and the subsequent process is the same as in exemplary embodiment 1.

Exemplary Embodiment 8

1.00 molar ratio CoO (high purity chemistry, 99%), 3.00 molar ratio $Li_2O$ (Kangfeng, 99%), 0.05 molar ratio $WO_3$ (high purity chemistry, 99%), 0.05 molar ratio $H_3BO_3$ (Samjeon Chemical, 98%) are weighed according to the molar ratio, and the subsequent process is the same as in exemplary embodiment 1.

Exemplary Embodiment 9

Weigh 0.001 molar ratio $WO_3$ (high purity chemical, 99%) and 0.001 molar ratio $H_3BO_3$ (Samjeon Chemical, 98%) to the powder prepared in exemplary embodiment 1 according to the molar ratio, uniformly coat and mix, and charge it in a vacuum furnace After removing the vacuum in the vacuum furnace and replacing it with nitrogen, the mixture was re-calcined while nitrogen was inflowed at 0.1 L/min. In the calcination step, the temperature was raised to 380° C. for 2 hours and maintained at the elevated temperature for 5 hours. Thereafter, the calcined material was cooled, pulverized and classified into micro powder to obtain a positive electrode additive.

Exemplary Embodiment 10

Weigh 0.005 molar ratio $WO_3$ (high purity chemical, 99%) and 0.005 molar ratio $H_3BO_3$ (Samjeon Chemical, 98%) to the powder prepared in exemplary embodiment 1 according to the molar ratio, and the subsequent process is the same as that of exemplary embodiment 9.

Exemplary Embodiment 11

Weigh 0.01 molar ratio $WO_3$ (high purity chemical, 99%) and 0.01 molar ratio $H_3BO_3$ (Samjeon Chemical, 98%) to the powder prepared in exemplary embodiment 1 according to the molar ratio, and the subsequent process is the same as that of exemplary embodiment 9.

Exemplary Embodiment 12

Weigh 0.05 molar ratio $WO_3$ (high purity chemical, 99%) and 0.05 molar ratio $H_3BO_3$ (Samjeon Chemical, 98%) to the powder prepared in exemplary embodiment 1 according to the molar ratio, and the subsequent process is the same as that of exemplary embodiment 9.

Experimental Example 1 Electrochemical evaluation was performed using a CR2032 coin cell. Slurry for electrode plate manufacturing was positive electrode additive: conductive material (super-C65): binder (PVDF, KF1120)=90: 5: 5 wt %, and NMP (N-Methyl-2-pyrrolidone) was added so that the solid content was about 30%. to adjust the slurry viscosity. The prepared slurry was coated on Al foil of 15 μm thickness using a doctor blade (Doctor blade), then dried and rolled. The electrode loading amount was 14.6 mg/cm², and the rolling density was 3.1 g/cm3. As the electrolyte solution, 1.5% VC was added to 1M $LiPF_6$ in EC:DMC:EMC=3: 4:3 (vol %), and a PP separator and lithium negative electrode (200 um, Honzo metal) were used to prepare a coin cell. After aging at room temperature for 10 hours, charge and discharge tests were performed. For capacity evaluation, 380 mAh/g was used as a standard capacity, and CC/CV 3.0 to 4.25V, 0.005 C cut-off was applied for charge and discharge conditions.

FIG. 1, 2 and Table 1 show the initial charge capacity (0.1 C charge) of $Li_2NiO_2$ (Comparative Example 1) and $Li_6CoO_4$ (exemplary embodiment 1 to 12).

TABLE 1

|  | initial charge capacity (mAh/g) | Gelation |
| --- | --- | --- |
| Comparative Example1 | 380 | ○ |
| exemplary embodiment1 | 754 | ○ |
| exemplary embodiment2 | 741 | ○ |
| exemplary embodiment3 | 789 | ○ |
| exemplary embodiment4 | 730 | ○ |
| exemplary embodiment5 | 762 | X |
| exemplary embodiment6 | 752 | X |
| exemplary embodiment7 | 735 | X |
| exemplary embodiment8 | 673 | X |
| exemplary embodiment9 | 738 | X |
| exemplary embodiment10 | 759 | X |
| exemplary embodiment11 | 745 | X |
| exemplary embodiment12 | 681 | X |

In FIG. 1, $Li_2NiO_2$, a comparative example, has a discharge capacity of 120 mAh/g compared to a charge capacity of 380 mAh/g and a non-reversible capacity of about 260 mAh/g. Example 1 shows a non-reversible capacity of about 720 mAh/g with a discharge capacity of 30 mAh/g compared to a 750 mAh/g charge capacity. Example 1 shows a higher non-reversible capacity. In addition, $Li_2NiO_2$ is changed to $LiNiO_2$ after charging, causing a gas generation problem as it is continuously decomposed and eluted into NiO during the charging and discharging process. However, the positive electrode additive, which exhibits the effect of improving the non-reversible capacity of $LisCoO_4$, decomposes $Li_6CoO_4$ after charging and moves six Li to the negative electrode to supplement the non-reversible lithium of the negative electrode. The positive electrode remains $LiCoO_2$ with good conductivity. $O_2$ gas generated during charging is removed in the stage of removing generated gas after initial charging and discharging in the completed cell. Since it is stable after that, there is no problem of continuous gas generation during charging and discharging like $Li_2NiO_2$ positive electrode additive, so it has greater merit.

In addition, the samples of Examples 5 to 12 do not have a gelation phenomenon of the cathode material slurry compared to other samples, so there is a merit that there is no problem with the use of a lot of cathode additives that have a non-reversible capacity improvement effect. This is because the boron compound and tungsten compound react with the $Li_2O$ and $Li_2CO_3$ remaining on the surface of the additive to change into stable lithium boron compound ($LiB_4O_7$) and lithium tungsten compound ($Li_2WO_4$). In other words, it has the merit that it can be used more stably in the electrode manufacturing process by reducing the PVDF binder gelation by basic lithium during slurry manufacturing.

However, as the BW content increases, there is a large reduction in the charging capacity, so the mixing ratio of the doping raw material is preferably 0.001 to 0.02 molar ratio.

Experimental Example 2

Experimental Example 2-1

For the slurry for the production of electrode plates, the positive electrode additive prepared by Example 11 was used. Anode additive: anode active material: conductive material (super-C65): binder (PVDF, KF1120)=1:95.5:1.5:2%, and NMP (N-Methyl-2-pyrrolidone) was added so that the solid content was about 30%. was added to adjust the slurry viscosity. The prepared slurry was coated on Al foil of 15 μm thickness using a doctor blade (Doctor blade), then dried and rolled. The electrode loading amount was 14.6 mg/cm², and the rolling density was 3.1 g/cm3. As the electrolyte solution, 1.5% VC was added to 1M $LiPF_6$ in EC:DMC:EMC=3:4:3 (vol %), and a PP separator and lithium negative electrode (200 um, Honzo metal) were used to prepare a coin cell. After aging at room temperature for 10 hours, charge and discharge tests were performed. Capacity evaluation was 200 mAh/g as a standard capacity, and CC/CV 3.0 to 4.25V, 0.005 C cut-off was applied for charge and discharge conditions.

Experimental Example 2-2

The same experiment as in Experimental Example 2-1 was performed except that positive electrode additive: positive electrode active material: conductive material (super-C65): binder (PVDF, KF1120)=2:94.5:1.5:2%. Experimental Example 2-3 The same experiment as in Experimental Example 2-1 was performed except that positive electrode additive: positive electrode active material: conductive material (super-C65): binder (PVDF, KF1120)=3:93.5:1.5:2%.

Comparative Example 2-1

The same experiment as in Experimental Example 2-1 was performed except that positive electrode additive: positive electrode active material: conductive material (super-C65): binder (PVDF, KF1120)=0:96.5:1.5:2% was used.

Experimental Example 2-4

In Experimental Example 2-1, the same experiment was performed using a graphite negative electrode instead of a lithium negative electrode.

Experimental Example 2-5

In Experimental Example 2-2, the same experiment was performed using a graphite negative electrode instead of a lithium negative electrode.

Experimental Example 2-6

In Experimental Example 2-3, the same experiment was performed using a graphite negative electrode instead of a lithium negative electrode.

Comparative Example 2-2

In Comparative Example 2-1, the same experiment was performed using a graphite negative electrode instead of a lithium negative electrode.

Table 2 shows the initial charge and discharge capacities (0.2 C charge and discharge) of Experimental Examples 2-1 to 2-6, Comparative Example 2-1 and Comparative Example 2-2.

TABLE 2

| | Experimental Example 2-1 | Experimental Example 2-2 | Experimental Example 2-3 | Comparative Example 2-1 | Experimental Example 2-4 | Experimental Example 2-5 | Experimental Example 2-6 | Comparative Example 2-2 |
|---|---|---|---|---|---|---|---|---|
| initial charge capacity (mAh/g) | 237.8 | 247.8 | 250.3 | 235.3 | 245.1 | 249.5 | 253.4 | 241.2 |
| Initial discharge capacity (mAh/g) | 204.8 | 203.5 | 206.8 | 213.0 | 204.0 | 205.6 | 205.9 | 194.9 |

If a graphite negative electrode is used instead of a lithium negative electrode as in the case of no positive electrode additive (Comparative Examples 2-1 and 2-2), the discharge capacity of 20 mAh/g is reduced due to the non-reversible negative electrode. It compensates for the non-reversible part of the negative electrode as in the case where a lot of positive additive is added (Experimental Examples 2-5, 2-6). Therefore, it shows the same discharge capacity as when using a lithium negative electrode, which has merit to realize stable charging and discharging capacity. The amount of the positive electrode additive can be used by adjusting the optimum amount according to the non-reversible capacity of the negative electrode.

The present invention is not limited to the exemplary embodiments and can be manufactured in various different forms, and a person of an ordinary skill in the technical field to which the present invention belongs is without changing the technical idea or essential features of the present invention. It will be understood that the invention may be embodied in other specific forms. Therefore, it should be understood that the exemplary embodiments described above are exemplary in all respects and not restrictive.

What is claimed is:

1. A positive electrode additive for a lithium secondary battery represented by Chemical Formula 1 below:

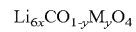    [Chemical Formula 1]

in the Chemical Formula 1, 0.9≤x≤1.1, 0<y≤0.1, $M_y=B_aW_b$, 0<a≤0.1, 0<b≤0.1.

2. The positive electrode additive of claim 1, wherein:
the positive electrode additive is coated with one or more of boron (B) and tungsten (W).

3. A positive electrode additive for lithium secondary battery, comprising:
a core represented by Chemical Formula 2 below; and
a coating layer comprising boron (B) and tungsten (W)

$$Li_{6x}CoO_4 \quad \text{[Chemical Formula 2]}$$

in the Chemical Formula 2, $0.9 \leq x \leq 1.1$.

4. A method of manufacturing a positive electrode additive for a lithium secondary battery represented by Chemical Formula 1 below, comprising:
preparing a precursor particle of CoO or Co(OH)$_2$;
preparing a mixture by mixing the precursor particle, lithium raw material, and doping raw material;
preparing a calcined product by calcining the mixture; and cooling and pulverizing the calcined material;
wherein, the doping raw material comprises boron (B) and tungsten (W),
wherein, a mixing ratio of the precursor particle and the lithium raw material is 1:5.9 to 1:6.1 by molar ratio,
wherein, a mixing ratio of the doping raw material to the mixture is 0.001 to 0.02 by molar ratio,
wherein, in the step of preparing a calcined product by calcining the mixture, $$Li_{6x}CO_{1-y}M_yO_4 \quad \text{[Chemical Formula 1]}$$

in the Chemical Formula 1, $0.9 \leq x \leq 1.1$, $0 < y \leq 0.1$, $M_y = B_a W_b$, $0 < a \leq 0.1$, $0 < b \leq 0.1$.

5. The method of claim 4, wherein:
the lithium raw material is at least one selected from the group consisting of Li$_2$CO$_3$, LiOH, C$_2$H$_3$LiO$_2$, LiNO$_3$, Li$_2$SO$_4$, Li$_2$SO$_3$, Li$_2$O, Li$_2$O$_2$, and LiCl.

6. The method of claim 4, wherein:
in the step of preparing a calcined product by calcining the mixture,
the calcination condition is in an inert atmosphere for 1 to 15 hours at a temperature range of 600 to 800° C.

7. A method of manufacturing a positive electrode additive for lithium secondary battery represented by Chemical Formula 3 below, comprising:
preparing a compound represented by the following Chemical Formula 3;
preparing a mixture by mixing the compound and doping raw material;
preparing a calcined product by calcining the mixture; and cooling and pulverizing the calcined material;
wherein, the doping raw material comprises boron (B) and tungsten (W),
wherein, a mixing ratio of the doping raw material to the compound represented by the Chemical Formula 3 is 0.001 to 0.02 by molar ratio:

$$Li_{6x}Co_aB_bW_cO_4 \quad \text{[Chemical Formula 3]}$$

in the Chemical Formula 3, $0.9 \leq x \leq 1.1$, $0.9 \leq a \leq 1$, $0 \leq b \leq 0.1$, $0 \leq c \leq 0.1$.

8. The method of claim 7, wherein:
in the step of calcining the mixture to prepare a calcined product;
a calcining condition is in an inert atmosphere for 1 to 10 hours in a temperature range of 250 to 450° C.

9. The method of claim 4 or claim 7, wherein:
after obtaining a lithium metal oxide, the method further comprises forming a coating layer by mixing the coating raw material with the lithium metal oxide and calcining that; and the coating raw material comprises at least one of boron (B) and tungsten (W).

10. A positive electrode for a lithium secondary battery, comprising:
a current collector; and
a positive active material layer positioned on the current collector surface;
wherein, the positive electrode active material layer comprises a positive electrode active material and a positive electrode additive,
the positive electrode additive is represented by the following chemical formula 3, and with respect to the sum of 100 wt % of the positive electrode active material and positive electrode additive, the positive electrode additive is 0.1 to 7 wt %"

$$Li_{6x}Co_aB_bW_cO_4 \quad \text{[Chemical Formula 3]}$$

In the Chemical Formula 3, $0.9 \leq x \leq 1.1$, $0.9 \leq a \leq 1$, $0 < b \leq 0.1$, and $0 < c \leq 0.1$.

11. The positive electrode of claim 10, wherein:
the positive electrode additive is coated with at least one of boron (B) and tungsten (W).

12. The positive electrode of claim 10, wherein:
the positive electrode additive is decomposed during initial charging and discharging and converted into a Li supply source and a compound represented by Chemical Formula 4 below $$LiCo_{1-y}M_yO_2 \quad \text{[Chemical Formula 4]}$$

in the Chemical Formula 4, $0 < y \leq 0.1$, $M_y = B_a W_b$, $0 \leq a \leq 0.1$, and $0 \leq b \leq 0.1$.

13. A lithium secondary battery, comprising:
a positive electrode;
a negative electrode; and
an electrolyte positioned between the positive and negative electrodes,
the positive electrode comprises the positive electrode additive according to claim 1 or claim 3.

* * * * *